Patented Feb. 9, 1932

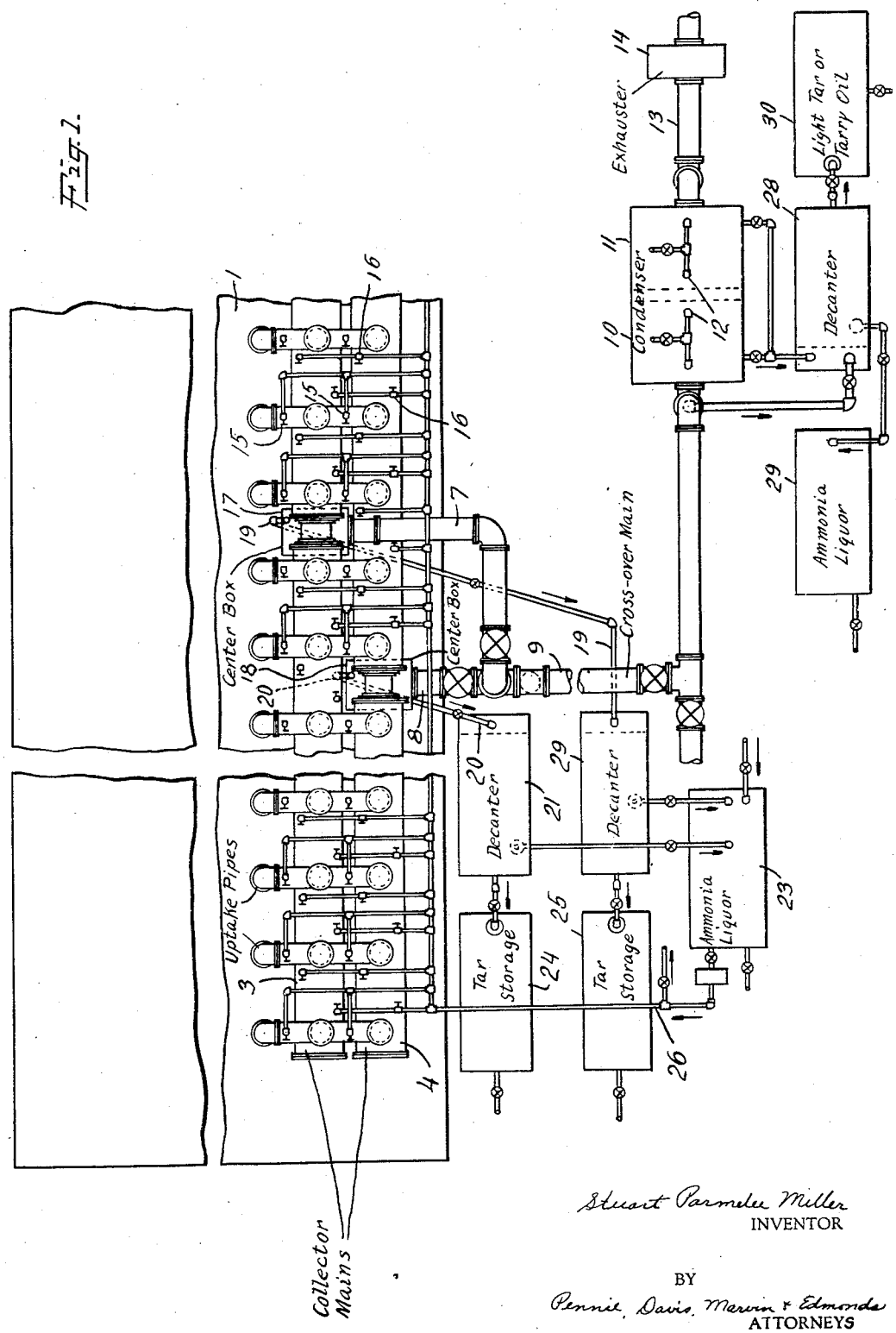

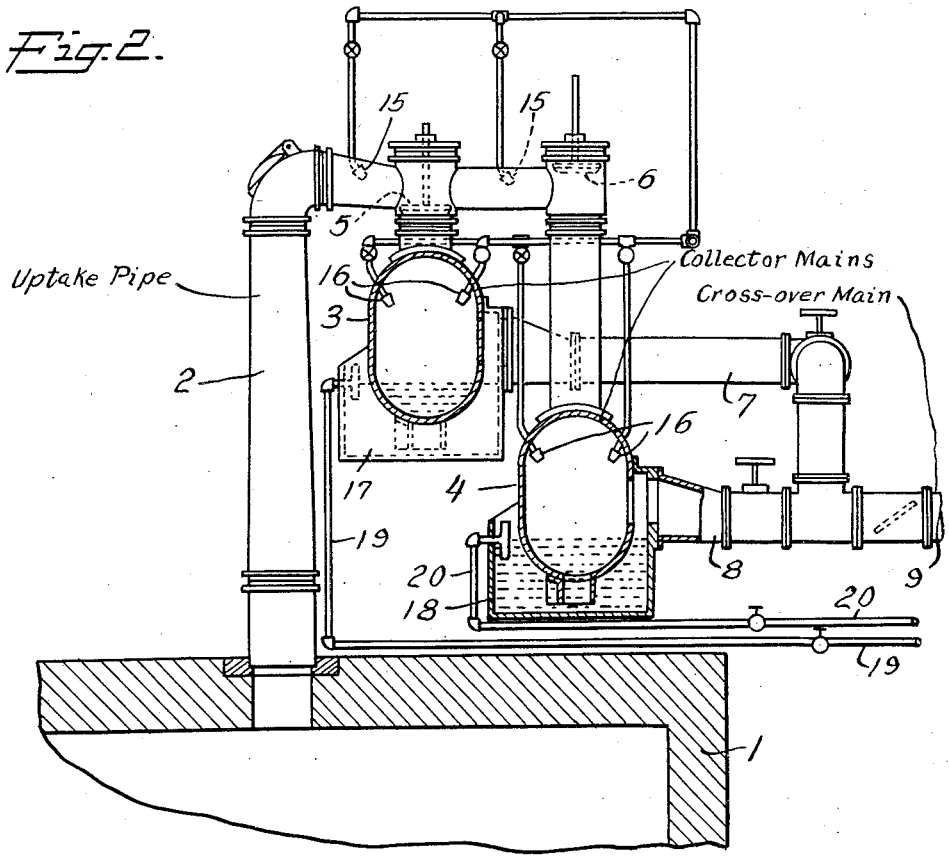

1,844,895

UNITED STATES PATENT OFFICE

STUART PARMELEE MILLER, OF ENGLEWOOD, NEW JERSEY, ASSIGNOR TO THE BARRETT COMPANY, OF NEW YORK, N. Y., A CORPORATION OF NEW JERSEY

OPERATION OF BY-PRODUCT RECOVERY SYSTEMS

Application filed December 29, 1927. Serial No. 243,304.

This invention relates to improvements in the operation of by-product recovery systems, particularly by-product recovery systems at coke oven plants.

In ordinary coal distillation plants, such as coke ovens, the gases from a number of the ovens are collected together in a common collector main and partially cooled therein and then passed through a cross-over main to a condensing system where the gases are further cooled, the tar being separated from the gases in part in the collector main and in part in the cross-over main and condensers.

At some coke oven plants, two collector mains have been provided to permit collecting separately the gases from the early period of the coking operation and those from the later period of the operation, so that, after the tar has been separated therefrom, the gases can be sold as "rich" and as "lean" gases, or so that the rich gases can be sold and the lean gases employed as fuel. In such cases, the tars from the respective collector mains and condensing systems are collected together as a composite tar and commonly shipped to tar distillation plants for distillation. The separate production of rich and lean gases requires that separate collector mains and separate condensing systems be provided, even though a much larger part of the gases and of the tar may be passed through one system and only a much smaller part of the gases passed through the other.

According to the present invention, I provide a plurality of collector mains for the gases from different stages of the coking operation, and I provide for the cooling of these gases in the collector main to separate therefrom a large part of the tar contained therein. I then combine the gases from the respective collector mains and pass them to a common condensing system, thereby recovering the remaining lighter tar or tarry oils from the composite gases as a composite product, and permitting the gases to be handled with the same advantage as in systems where only a single collector main and single condensing system is provided. In connection with the plurality of collector mains, I also provide for the separate withdrawal of the tar from the mains and for keeping the respective tars separate. Thereby I am enabled to collect simultaneously tars of low, intermediate or high carbon content, together with a composite lighter tar or tarry oil.

The present invention presents the advantage that the greater part of the tar can be separated from the gases in the collector mains, and this tar will be a relatively heavy tar, which, on distillation, will give pitch with a minimum of distillation. The respective tars from the respective collector mains will vary in their carbon content and other properties, but with a minimum of distillation these heavy tars can be distilled to give respectively high, low or intermediate carbon pitches of varying melting points.

Furthermore, the greater part of the tar acids or phenols will be contained in the lighter tar or tarry oil collected in the condensers, and by collecting the total composite lighter tar together, this can be distilled as a whole to recover tar acid oils and other oil fractions therefrom.

The invention has the further advantage that the condensing system can be designed to take care of the total gas produced continuously from the total number of coke ovens connected thereto, and its capacity can be designed for the effective handling of the gases.

The present invention is distinguished from present two-main systems in which the tar from the different systems is combined and the gases kept separate by the fact that the gases are combined and the heavy tars from the collector mains kept separate, thereby providing a high carbon tar and a low carbon tar product, and a heavy tar in each case, from the collector mains, and a composite total light tar or tarry oil which can advantageously be distilled separately to give a relatively high yield of oils, including tar acid oils.

The invention will be further described in connection with the accompanying drawings, which illustrate, in a more or less conventional and diagrammatic manner, a coke oven plant adapted for the practice of the invention, but it is intended and will be understood that the invention is illustrated thereby but is not limited thereto.

In the accompanying drawings

Fig. 1 is a plan view showing part of a coke oven battery having the improved by-product recovery system of the present invention combined therewith; and Fig. 2 is an elevation showing part of the coke oven and by-product recovery system of Fig. 1.

In the drawings, the individual coke ovens 1 are shown as provided with the usual uptake pipes 2 connected with each of two collector mains 3 and 4, and having individual valves 5 and 6 which permits each uptake pipe to be connected to one of the other of the collector mains. Each main has a separate gas outlet pipe indicated at 7 and 8, but these two pipes combine into a common cross-over main 9 which leads to the condensing system shown as two condensers 10 and 11 of the direct type in which the gases are cooled by the introduction of a cooling liquid such as ammonia liquor introduced through nozzles 12. From the condensers the gases pass through main 13 to exhauster 14 and then to the ammonia absorbing system (not shown).

Provision is made for cooling the gases in the respective collector mains, this provision being shown as a series of spray nozzles 15 discharging into the uptake pipes where the gases enter the collector mains, and additional spray nozzles 16 discharging into the respective collector mains. The introduction of ammonia liquor into the respective mains rapidly cools the gases therein and separates a considerable part of the tar from the gases, usually considerably more than half of the total tar carried by the gases, and this tar will be a relatively heavy tar.

The tar separated from the respective mains will be of high or low carbon content relatively, depending upon the portion of the coking operation during which the gases are collected in one of the other mains. These heavy tars from the respective collector mains are kept separate, being drawn off from the respective center boxes 17 and 18 through lines 19 and 20 to separating tanks or decanters 21 and 22 from which the ammonia liquor collects in tank 23 while the respective tars are kept separate and collected in tanks 24 and 25. The ammonia liquor from tank 23, together with that from the condensers, can in part be returned through line 26 to the spray nozzles in the collector mains, and in part delivered to storage or after cooling, to the direct condensers and thence to the ammonia recovery plant.

The lighter tar or tarry oils separated in the condensers is shown as being collected together as a total condensate in the separating tank or decanter 28, from which the ammonia liquor is collected in tank 29 and the lighter tar in tank 30.

The tars produced according to the present invention are therefore a heavy high carbon tar from one collector main, a heavy low carbon tar from the other collector main, and a composite light tar from the condensing systems; while the total gases from the system are handled together through a single condensing and gas handling system.

The respective heavy tars can be separately distilled to give relatively high and low carbon pitch with a minimum of distillation, because of the relatively smaller oil content which it contains; while the lighter composite tar will give a relatively high yield of distillate oils, including tar acid oils, when separately subjected to distillation.

While the invention has been more particularly described in connection with coke oven plants, it is applicable in other coal distillation plants for permitting the collecting separately of a plurality of tars from the gases given off during different periods of the coal distillation, while permitting the total gases to be subsequently handled together, and giving a composite light tar or tarry oil.

I claim:—

1. The method of recovering heavy tars of different carbon content and light tar from the coal distillation gases at coal distillation plants, which comprises collecting separately in separate collector mains the gases from different stages of the coking of coal in the ovens or retorts, cooling the gases in the respective mains to separate heavy tars therefrom, separately withdrawing and keeping separate the respective tars, combining the gases from which tars have been separated and further cooling the combined gases to separate a light composite tar therefrom.

2. The method of recovering heavy tars of different carbon content and light tar from the coal distillation gases at coke oven plants, which comprises collecting separately the gases from different stages of the coking operation in separate collector mains, cooling the respective gases in the respective collector mains to separate heavy tars therefrom, by the introduction of ammonia liquor into the respective collector mains, separately drawing off and keeping separate the tars from the respective collector mains, separating ammonia liquor therefrom, and returning the ammonia liquor for the cooling of the gases in the collector mains, combining the gases from which the respective tars have been separated in the respective collector mains and further cooling the combined gases to separate a light composite tar therefrom.

3. The method of producing pitches of different characteristics from heavy tars of different carbon content and light tar recovered from the coal distillation gases at coal distillation plants, which comprises collecting separately in separate collector mains the gases from different stages of the coking of coal in the ovens or retorts, cooling the gases in the respective mains to separate heavy tars therefrom, separately withdrawing and keeping separate the respective tars, combining the gases from which tars have been separated, further cooling the combined gases to separate a light composite tar therefrom, separately distilling the respective heavy tars to produce pitches of different characters therefrom, and separately distilling the composite lighter tar to separate a high yield of distillate oils therefrom.

In testimony whereof I affix my signature.

STUART PARMELEE MILLER.